(12) United States Patent
Park

(10) Patent No.: US 6,889,989 B2
(45) Date of Patent: May 10, 2005

(54) TORSION BEAM SUSPENSION

(75) Inventor: Jong-Sung Park, Daejeon (KR)

(73) Assignee: Hyundai MOBIS Co., Ltd., Yongin-shi (KR)

( * ) Notice: Subject to any disclaimer, the term of this patent is extended or adjusted under 35 U.S.C. 154(b) by 162 days.

(21) Appl. No.: 10/329,966

(22) Filed: Dec. 30, 2002

(65) Prior Publication Data

US 2004/0032106 A1 Feb. 19, 2004

(30) Foreign Application Priority Data

Aug. 16, 2002 (KR) .................................. 10-2002-0048405

(51) Int. Cl.[7] .............................................. B60G 11/18
(52) U.S. Cl. ..................... 280/124.166; 280/124.107; 280/124.128; 301/124.1
(58) Field of Search ................... 280/124.166, 124.107, 280/124.128, 124.106; 301/124.1; 267/273

(56) References Cited

FOREIGN PATENT DOCUMENTS

| JP | 10-329519 A | * | 12/1998 |
|---|---|---|---|
| JP | 2001-88525 A | * | 4/2001 |

* cited by examiner

Primary Examiner—Ruth Ilan
(74) Attorney, Agent, or Firm—Greenblum & Bernstein, P.L.C.

(57) ABSTRACT

The present invention provides a torsion beam suspension including a left spindle that rotably supports a left wheel of rear wheels, a right spindle that rotably supports a right wheel of the rear wheels, a left trailing arm, a right trailing arm, a left bush, a right bush, and a torsion beam for connecting the left trailing arm arid the right trailing arm. The torsion beam has a U-shaped open section in which openings are formed in a rear portion of the car body, the open section of the torsion beam is enlarged and is located closer to the rear portion of the car body as the openings are closer to the left and right trailing arms, and the torsion beam comprises ribs having closed sections which are increased as the enlarged open section is closer to the left and right trailing arms.

2 Claims, 1 Drawing Sheet

TORSION BEAM SUSPENSION

BACKGROUND OF THE INVENTION

1. Field of the Invention

The present invention relates to a torsion beam suspension in which ribs are mounted on both sides of a torsion beam having a U shape of section for connecting a pair of trailing arms in order to form a closed section.

2. Description of the Related Art

A suspension is an apparatus for enhancing a passenger's feeling and a roadholding of a car by connecting a car axis and a car body and thereby preventing a vibration or shock applied to the car axis from a road surface, from being directly transferred to the car body, upon traveling, to avoid a damage of the car body.

Also, because up and down movements of left, right and back directions of wheels are controlled through a torsion of the torsion beam, a roll strength can be also controlled by the torsion beam.

To increase such a torsion strength of the torsion beam, a torsion beam having a U shape of section in which an opening is formed in the rear portion of the car body, has been adopted. Also, to reinforce the torsion beam jointed with the trailing arms, the section shape of the torsion beam has been changed in the both ends of the torsion beam in such a manner that the depth of the opening is deeper toward the jointed parts (shown in FIG. 1).

However, the torsion beam whose section shape has been changed has an efficiency of increasing an warping, rather than an efficiency of increasing the torsion strength in the jointed parts with the trailing arms, thereby concentrating a stress in the jointed parts and allowing it to break the torsion beam.

SUMMARY OF THE INVENTION

Therefore, the present invention has been made in view of the above problem, and it is an object of the present invention to provide a torsion beam suspension for increasing a torsion strength and decreasing a warping thereby reducing a stress generated in the jointed parts of trailing arms and a torsion beam.

In accordance with the present invention, the above and other objects can be accomplished by the provision of a torsion beam suspension comprising: a left spindle for rotably supporting a left wheel of rear wheels; a right spindle for rotably supporting a right wheel of the rear wheels; a left trailing arm which is disposed in a longitudinal direction of a car body and having a first side coupled with the left spindle; a right trailing arm which is disposed in the longitudinal direction of the car body and having a first side coupled with the right spindle; a left bush for connecting a second side of the left trailing arm to the car body; a right bush for connecting a second side of the right trailing arm to the car body; and a torsion beam for connecting the left tailing arm and the right trailing arm, wherein the torsion beam includes a U-shaped open section having a central portion and enlarged portions located on each side of the central portion. The torsion beam includes ribs located in the enlarged portions and forming closed sections which increase in size as the distance from the central portion increases.

Under this construction, it is possible to increase a torsion strength, decrease a warping, and thereby reduce a stress generated in the jointed parts of the trailing arms and the torsion beam.

In the above construction, grooves are further formed on the ribs located at the changed parts from the open section to the closed section in order to ease a sharp change of the torsion strength.

Also, the ribs are extended-mounted toward the open sections. Because the distance of the rib and the opening of the open section is longer than that of the rib and the opening of the enlarged open section, the sharp change of the torsion strength can be eased through an increment of a section modulus.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Now, a preferred embodiment of the present invention will be described in detail with reference to the accompanying drawings.

Figure 1:
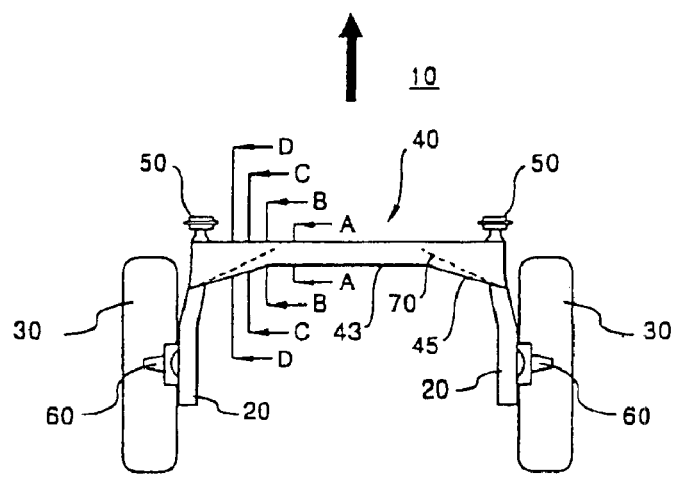
FIG. 1 is a plan showing a main part of a torsion beam suspension in accordance with a preferred embodiment of the present invention.
Figure 2:
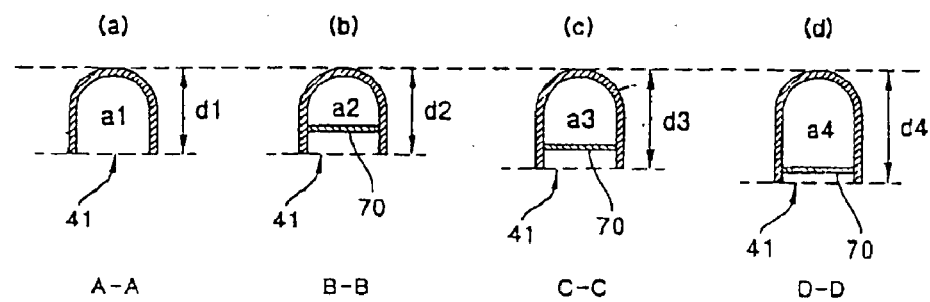
FIG. 2 is a sectional view taken along a dotted line of FIG. 1.
Figure 3:
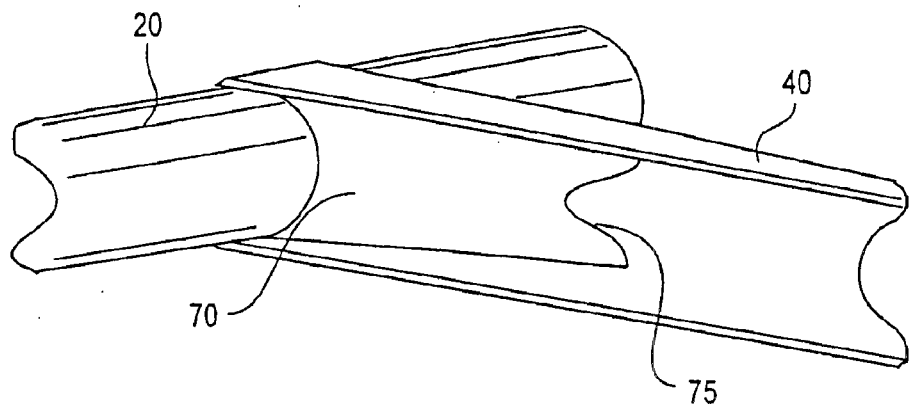
FIG. 3 is a partial perspective view showing the main part of the present invention.

FIG. 1 is a plan showing a main part of the torsion beam suspension in accordance with the preferred embodiment of the present invention, FIG. 2 is a sectional view taken along a dotted line of FIG. 1 and FIG. 3 is a partial perspective view showing the main part of the present invention.

A torsion beam suspension 10 of the present invention includes, as shown in FIG. 1, spindles 60 for rotably supporting wheels 30, a pair of trailing arms 20 whose one-sides are connected to the respective spindles 60, a torsion beam 40 for connecting the trailing arms 20 to each other, and bushes 50 for connecting the other sides of the trailing arms 20 to a car body (not shown).

The rear portions of the trailing arms 20 are coupled with the spindles 60 and the front portions thereof are coupled to the car body (not shown) through the bushes 50 so that the trailing arms 20 are disposed along a longitudinal direction of the car body. Through this construction, when the wheels move up and down, the trailing arms 20 also move up and down.

Each of the bushes 50 consists of an external case member (not shown), an inner case member (not shown), and an elastic member (not shown) mounted between the external case member and the inner case. The external case member is fixed to the trailing arm 20 through a welding, and the inner case member is connected to a bracket (not shown) of the car body by bolts (not shown) and nuts (not shown). A rubber product having an elasticity is commonly used as the elastic member. The bush 50 is called a rubber bush.

In the case that both side rear-wheels 30 of the torsion beam 40 are moved up and down in different directions to each other due to windings of a road surface, the torsion beam 40 is subject to the torsion strength and both ends of the torsion beam 40 are welded to the trailing arms 20 for restoring the torsion strength to the former state. This torsion beam 40 may be an axel beam type (U shape), a pivot axel type (reversed U shape) or a H-type in order to connect the trailing arms 20.

Also, to increase the torsion strength, as shown in (a) of FIG. 2, the torsion beam 40 has a U shape of open section 43 in which the opening 41 is formed at the center portion thereof in the rear portion of the car body. The section shape of the torsion beam 40 is constant along the longitudinal direction of the car body.

As shown in (b) to (d) of FIG. 2, enlarged open sections 45 are formed at both sides of the open section 43 in such a manner that the depths of the enlarged open sections 45 increase from d2 to d4 as the enlarged open sections 45 are closer to the trailing arms 20 (this is same that locations of opening 41 are closer to the rear portion of the car body).

Further, as shown in FIG. 3, ribs 70 are mounted in the enlarged open sections 45. Through the mounting of the rib 70, the enlarged open section 45 is changed to a closed section. That is, as shown in (b) to (d) of FIG. 2, because the opening 41 of the enlarged open section 45 is closed with the rib 70, the closed section is formed. It is desired for this rib 70 to be disposed in a manner to increase the area of the closed section, as with the expanded open section 45. That is, as shown in (b) to (d) of FIG. 2, the closed section is mounted in a manner to increase the area thereof toward the trailing arms 20 from a2 to a4.

Thus, the closed section is formed in such a manner that the open section 43 is formed in the center portion thereof for allowing a torsion and the ribs 70 are mounted at the enlarged open sections 45 of the both sides thereof, thereby increasing the torsion strength, decreasing the warping and reducing a stress in the jointed parts of the trailing arms 20 and the torsion beam 40.

Also, because the closed section is increased gradually, it is possible to ease the sharp torsion strength. Besides, as shown in the dotted line of FIG. 1, the ribs 70 are extended-mounted toward the open section 43, and the distance between the opening 41 of the open section 43 and the rib 70 is longer than that between the opening 41 of the enlarged open section 45 and the rib 70, thereby reducing the sectional change of the closed section gradually and further easing the sharp torsion strength.

On the other hand, it is desired for the groove 75 to be formed on the rib 70 located at the changed part from the open section 43 to the expanded open section 45 or the extended part to the open section 43. This groove 75 acts to lessen the sharp torsion strength.

While the invention has been shown and described with reference to certain preferred embodiments thereof, it will be understood by those skilled in the art that various changes in form and details may be made therein without departing from the spirit and scope of the invention as defined by the appended claims.

The torsion beam suspension of the present invention has advantages as follows:

(1) The torsion beam suspension comprises a left spindle for rotably supporting a left wheel of rear wheels; a right spindle for rotably supporting a right wheel of the rear wheels; a left trailing arm which is disposed in a longitudinal direction of a car body and whose one side is coupled with the left spindle; a right trailing arm which is disposed in the longitudinal direction of the car body and whose one side is coupled with the right spindle; a left bush for connecting the other side of the left trailing arm to the car body; a right bush for connecting the other side of the right trailing arm to the car body; and a torsion beam for connecting the left trailing arm and the right trailing arm, wherein the torsion beam includes an U shape of open section in which openings are formed in a rear portion of the car body, both open sections of the torsion beam have enlarged open sections in such a manner that the enlarged open sections are located closer to the rear portion of the car body as the openings are closer to the left and right trailing arms, and the torsion beam includes ribs having closed sections which are increased as the enlarged open sections are closer to the left and right trailing arms. Therefore, the center portion of the torsion beam allows a torsion toward the open section and the both ends of the torsion beam have a closed section shape to decrease a warping as well as increase a torsion strength thereby minimizing a stress generated in the jointed part of the torsion beam and the trailing arms.

(2) Grooves are formed in the ribs located at the changed part from the open section to the closed section thereby easing a sharp change of a torsion strength.

(3) The rib is extended-mounted toward the open section, and the distance between the rib and the opening of the open section is longer than that between the rib and the opening of the enlarged open section, thereby further easing the sharp change of the torsion strength.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A torsion beam suspension comprising:
   a left spindle that rotably supports a left rear wheel;
   a right spindle that rotably supports a right rear wheel;
   a left trailing arm disposed in a longitudinal direction of a car body, a first side of the left trailing arm being coupled with the left spindle;
   a right trailing arm disposed in the longitudinal direction of the car body, a first side of the right trailing arm being coupled with the right spindle;
   a left bush that connects a second side of the left trailing arm to the car body;
   a right bush that connects a second side of the right trailing arm to the car body; and
   a torsion beam for connecting the left trailing arm and the right trailing arm, the torsion beam comprising a U-shaped open section having a central portion and enlarged portions located on each side of the central portion, the torsion beam further comprising ribs located in the enlarged portions and forming closed sections which increase in size as the distance from the central portion increases,
   wherein the ribs are located at locations where the enlarged portions adjoin the central portion, and grooves are formed on the ribs.

2. The torsion beam suspension according to claim 1, wherein the ribs are extended toward the central portion, and the distance between the rib and an opening of the central portion is larger than the distance between the rib and an opening of the enlarged portion.

* * * * *